US006430330B1

(12) United States Patent
Hagelin (10) Patent No.: US 6,430,330 B1
(45) Date of Patent: *Aug. 6, 2002

(54) MODULAR APPROACH TO SUBSTRATE POPULATION IN A FIBER OPTIC CROSS CONNECT

(75) Inventor: Paul Merritt Hagelin, Saratoga, CA (US)

(73) Assignee: C Speed Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/549,799

(22) Filed: Apr. 14, 2000

(51) Int. Cl.[7] .................................................. G02B 6/26
(52) U.S. Cl. ........................ 385/17; 385/18; 359/224; 359/872
(58) Field of Search .............................. 385/17, 18, 16; 359/223, 224, 872, 873

(56) References Cited

U.S. PATENT DOCUMENTS

| | | | |
|---|---|---|---|
| 5,155,778 A | 10/1992 | Magel et al. | 385/18 |
| 5,247,593 A | 9/1993 | Lin et al. | |
| 5,440,654 A | 8/1995 | Lambert, Jr. | 385/17 |
| 5,524,153 A | 6/1996 | Laor | 385/16 |
| 5,808,780 A | 9/1998 | McDonald | 359/290 |
| 5,960,132 A | 9/1999 | Lin | |
| 5,982,554 A | 11/1999 | Goldstein et al. | |

FOREIGN PATENT DOCUMENTS

EP   1162169   12/2001

OTHER PUBLICATIONS

"Optical–layer Networking: Opportunities for and Progress in Lightwave Micromachines," OFC 2000 Tutorials, Lih Y. Lin and Evan Goldstein, ATT Research, (Mar. 10, 2000).
Koh, Seunggug et al., "Optoelectronic Multipchip Modules based on MicroOptoElectroMechanical System Fabrication," IEEE 1996, pp. 53–60.
Tixier, Agnès et al., "3–D Microsystem Packaging for Interconnecting Electrical, Optical and Mechanical Microdevices to the External World," IEEE, Jan. 2000, pp. 698–703.

Primary Examiner—Cassandra Spyrou
Assistant Examiner—Fayez Assaf
(74) Attorney, Agent, or Firm—Sawyer Law Group LLP

(57) ABSTRACT

The present invention provides a fiber optic cross connect (OXC) package which utilizes a modular approach to substrate population. The OXC includes a slab, where the slab comprises a first surface and a second surface, and a micromirror array coupled to the second surface of the slab, where the micromirror array comprises a plurality of clusters, where each of the plurality of clusters includes at least one micromirror of the micromirror array. In the preferred embodiment, the slab is a substrate. Chips containing micromirrors are fabricated in clusters so that groups of micromirrors can be separately placed onto the substrate. This provides flexibility in how the substrate is populated. In the preferred embodiment, the clusters are in the form of strips. Only strips with known good micromirrors are placed onto the substrate, thus improving the device yield. Also, if any of the micromirrors become damaged after placement, its chip may be replaced without disturbing the other chips. Using a substrate through which light may travel in combination with a modular approach to substrate population allows for a single substrate switch with a higher device yield and scalability. Integrated circuits may be placed on the same substrate as the micromirrors, and the complexity of the assembly process is reduced.

22 Claims, 5 Drawing Sheets

Top View

Top View
FIGURE 1A

Side View
FIGURE 1B

Top View (photodetectors)
FIGURE 4A

Side View
FIGURE 4B

FIGURE 5

MODULAR APPROACH TO SUBSTRATE POPULATION IN A FIBER OPTIC CROSS CONNECT

FIELD OF THE INVENTION

The present invention relates to fiber optic cross connects, and more particularly to the population of a substrate in fiber optic cross connects.

BACKGROUND OF THE INVENTION

The use of optical cross connect (OXC) switching systems are well known in the art for directing a light beam from one optical port in an optical transmission system to another optical port. In a typical OXC, a plurality of input optical fibers, or ports, carry light beams into the OXC. The OXC then directs, or switches, the light beams to their respective plurality of output ports. Many conventional OXCs perform the switching utilizing micromirrors, which are micro-machined onto a substrate. The micromirrors are used to reflect a light beam from an input port to a particular output port. In this specification, the words "input" and "output" are used to indicate a direction of travel for a light beam into and out of, respectively, a switch. In reality, the input and output ports can be used simultaneously for input and output, as is the case in bidirectional data transfer.

High port count switches utilizing micromirrors are of high demand in the industry. Such switches require a tight packing density of the micromirrors onto the substrate. Some conventional switches use a digital switching matrix for N input and N output ports with an N×N array of micromirrors. This requires a total of $N^2$ number of micromirrors. However, this architecture becomes impractical for switch port counts greater than a few hundred.

Some conventional switches use an analog switching matrix for N input and N output ports. This requires 2*N micromirrors. In this configuration, two separate substrates, or one very large substrate, are necessary to accommodate port counts greater than a few hundred. However, the use of more than one substrate is cumbersome as they need to be aligned to each other within the package of the switch. This adds complexity to the assembly of the package and increases package size. Also, with a hundred or more micromirrors on a single substrate, or one half of a two-substrate OXC, device yield is compromised due to the large number of possible failure points. Additionally, hermetically sealing the optical components requires additional complex steps in the manufacturing process, such as metallization of the fibers or optical component attached to the fibers.

Accordingly, there exists a need for an improved OXC package which provides a high port count while also providing a high device yield. The present invention addresses such a need.

SUMMARY OF THE INVENTION

The present invention provides a fiber optic cross connect (OXC) package which utilizes a modular approach to substrate population. The OXC includes a slab, where the slab comprises a first surface and a second surface, and a micromirror array coupled to the second surface of the slab, where the micromirror array comprises a plurality of clusters, where each of the plurality of clusters includes at least one micromirror of the micromirror array. In the preferred embodiment, the slab is a substrate. Chips containing micromirrors are fabricated in clusters so that groups of micromirrors can be separately placed onto the substrate. This provides flexibility in how the substrate is populated. In the preferred embodiment, the clusters are in the form of strips. Only strips with known good micromirrors are placed onto the substrate, thus improving the device yield. Also, if any of the micromirrors become damaged after placement, its chip may be replaced without disturbing the other chips. Using a substrate through which light may travel in combination with a modular approach to substrate population allows for a single substrate switch with a higher device yield and scalability. Integrated circuits may be placed on the same substrate as the micromirrors, and the complexity of the assembly process is reduced.

DETAILED DESCRIPTION

The present invention provides an improved optical cross connect (OXC) package which provides a high port count while also providing a high device yield. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The improved OXC package in accordance with the present invention utilizes a modular approach to substrate population. Chips containing micromirrors are fabricated in clusters so that groups of micromirrors can be separately placed onto the substrate. This provides flexibility in how the substrate is populated. In the preferred embodiment, the clusters are in the form of strips. Only strips with known good micromirrors are placed onto the substrate, thus improving the device yield. Also, if any of the micromirrors become damaged after placement, its chip may be replaced without disturbing the other chips.

To more particularly describe the features of the present invention, please refer to FIGS. 1A through 5 in conjunction with the discussion below.

Figure 1A:
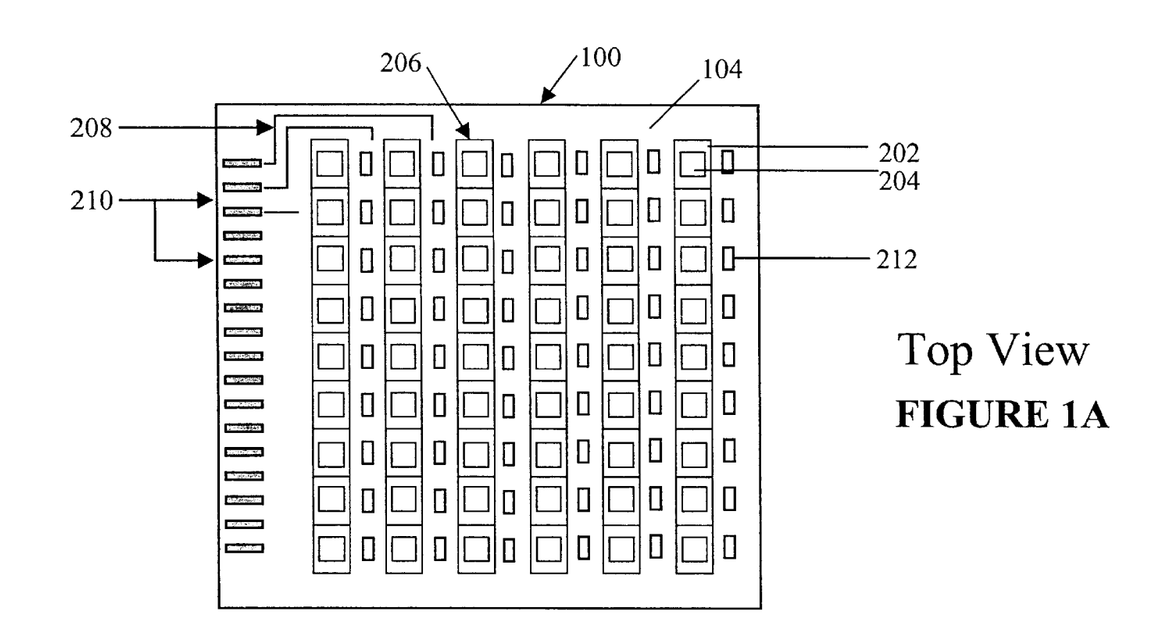
FIGS. 1A and 1B illustrate a top view and a side view, respectively, of a preferred embodiment of a modular approach to substrate population in accordance with the present invention.
Figure 1B:
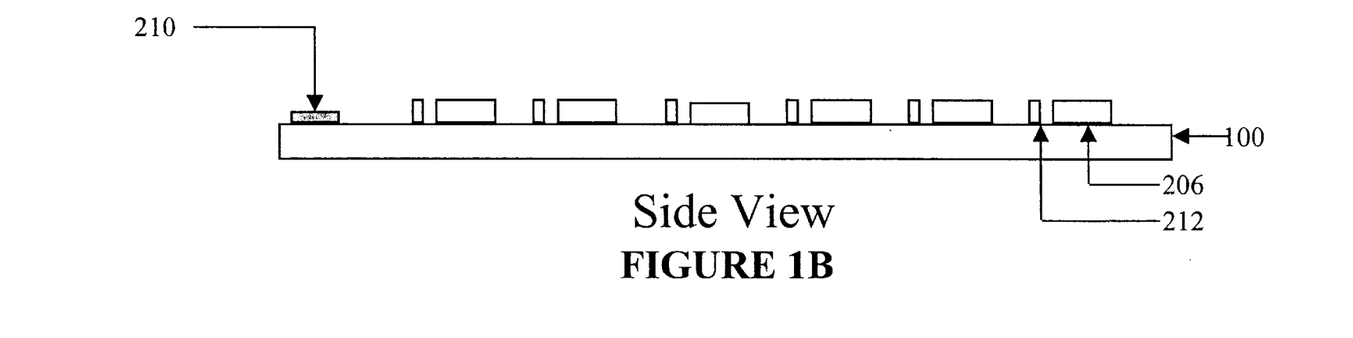

FIGS. 1A and 1B illustrate a top view and a side view, respectively, of a preferred embodiment of a modular approach to substrate population in accordance with the present invention. The substrate 100 has a first surface 102 and a second surface 104. A plurality of chips 202, each containing at least one micromirror 204, are placed onto the second surface 104 of the substrate 100. In the preferred embodiment, the chips 202 are placed and configured on the substrate 100 in strips 206, with a plurality of chips on each strip. The strips 206 may then be located sparsely on the substrate 100. Because each group of micromirrors 204 is on a separate chip 202, the chips 202 may be separately selected to be placed onto the substrate 100, providing flexibility in how the substrate is populated. Chips with defective micromirrors may be discovered prior to configuration of the chips 202 so that only known good chips 202 are used in the micromirror array 204. This improves the yield of the device. Also, if any of the micromirrors 204 become damaged after placement, its chip may be replaced without disturbing the other chips. The entire micromirror array 204 need not be discarded.

Although the present invention is described as fabricating the chips in strips, one of ordinary skill in the art will understand that any chip cluster size, including single chip size, may be used without departing from the spirit and scope of the present invention.

The second surface 104 of the substrate 100 may also comprise conductive traces 208 for the transfer of electrical signals from wire bonds 210, or other electrical connections to external conductors, to the micromirror array 204 for the purpose of controlling the micromirrors 204 or signal sensing. The substrate 100 also allows inclusion of integrated circuits 212 close to the micromirrors 204 for control and positioning of the micromirrors 204. This eliminates the need for a separate chip for the integrated circuits, as is required with conventional switches. Also, with the integrated circuits 212 so close to the micromirror array 204, shunt capacitance and noise coupling between them are reduced. Each integrated circuits 212 may all be placed at the same distance from their respective micromirror, either on the micromirror chips 202 and/or on the substrate 100. This allows even lower shunt capacitance and noise coupling, providing clearer signals.

By using the modular approach to substrate population in accordance with the present invention, high port count switches may be formed. The chips 202, micromirrors 204, and integrated circuits 212 may all be tested prior to final assembly, so that the switch has a lower failure rate.

Figure 2:
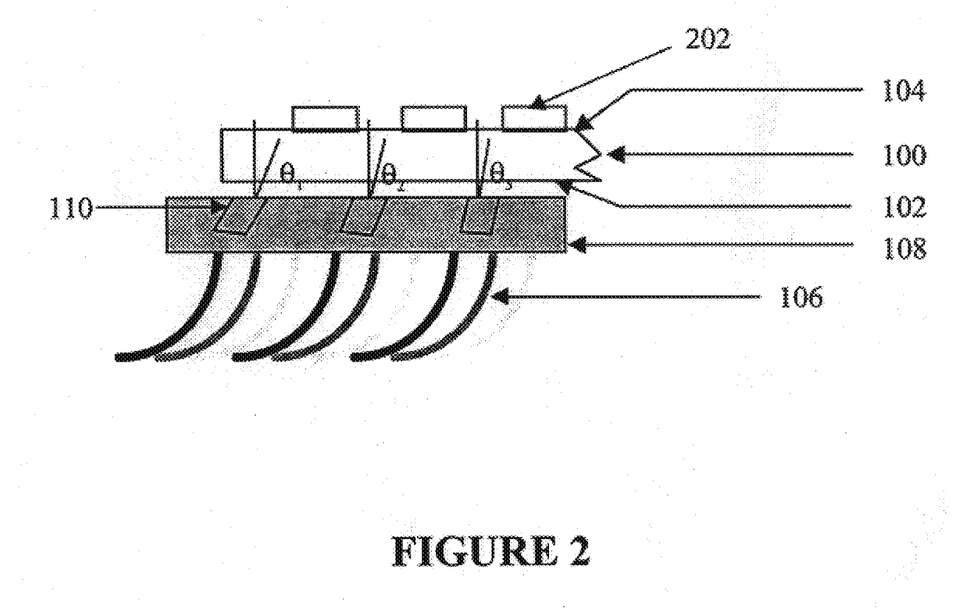
FIG. 2 illustrates a side view of a preferred embodiment of the substrate populated with the modular approach in accordance with the present invention.

FIG. 2 illustrates a side view of a preferred embodiment of the substrate populated with the modular approach in accordance with the present invention. The preferred embodiment of the substrate 100 is a rigid and transparent single or multi-layered planar slab with a first 102 and second 104 parallel surfaces. The substrate 100 may be composed of any material which allows the substrate 100 to be optically transparent to the wavelengths of interest. As illustrated, light may enter the substrate 100 from the first surface 102 via a plurality of optical fibers 106 attached to a fiber housing 108. The housing 108 can include a single holder or more than one holder containing independently aligned optical fibers 106. The substrate 100 is preferably coated on the first 102 and second 104 surfaces with conventional anti-reflective coatings to avoid reflections back to the fiber housing 106. Also, the substrate 100 can be coated with a conductive layer to prevent charge buildup on the substrate 100. The light then traverses through the substrate 100 and exits from the second surface 104. Chips 202 containing the micromirrors 204 and other reflective elements (not shown) populate the second surface 104 of the substrate 100 using the modular approach described above. The chips 202 may comprise either static mirrors, active mirrors, or a combination of static and active mirrors. In the preferred embodiment, the housing 108 may contain embedded optical collimators 110. Each collimator 110 is placed at a specific angle, $\theta_1$–$\theta_3$. The housing 108 may be composed of any appropriate material. Various methods of collimation and/or redirection may be used, such as lenses, diffractive components collimator, and other appropriate components collimator.

Although the preferred embodiment of the substrate is described above as being a transparent slab, one of ordinary skill in the art will understand that any substrate which allows light beams to traverse through it is within the spirit and scope of the present invention. For example, the substrate may be a silicon wafer with holes etched all the way through to allow light beams to pass through it. Alternatively, the substrate may be a double-side polished wafer on which the micromirrors are fabricated. In this case, appropriate anti-reflecting coatings are applied to both surfaces of the substrate.

The substrate is further described in co-pending U.S. patent application entitled "Fiber Optic Cross Connect with Transparent Substrate", Ser. No. 09/549,789, filed on Apr. 14, 2000. Applicants hereby incorporate this patent application by reference.

Figure 3:
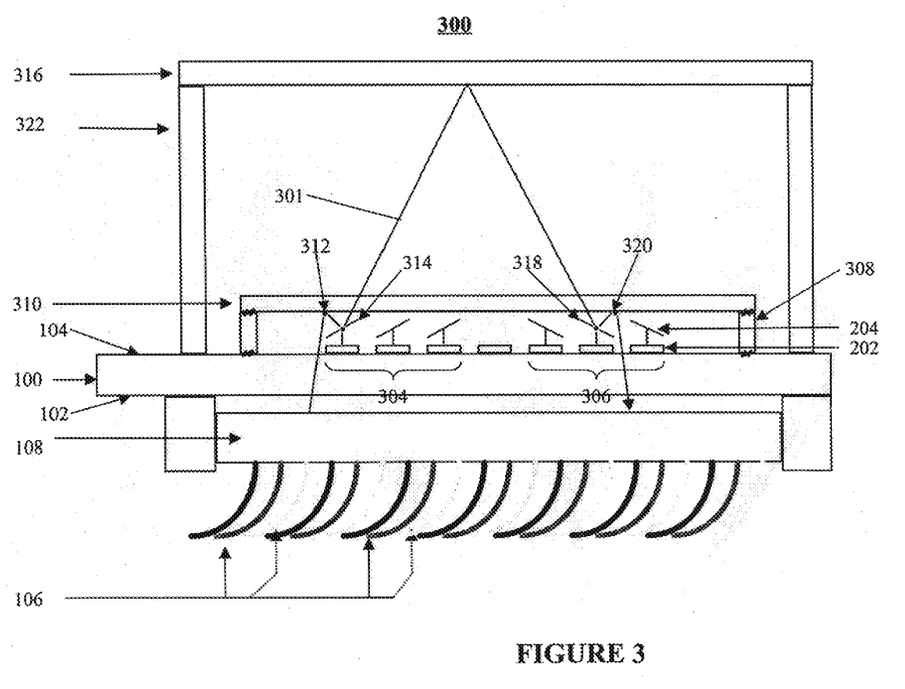
FIG. 3 illustrates a side view of a preferred embodiment of a switch architecture which utilizes a substrate populated with the modular approach in accordance with the present invention.

FIG. 3 illustrates a side view of a preferred embodiment of a switch architecture which utilizes a substrate populated with the modular approach in accordance with the present invention. This architecture comprises the substrate 100 and a two dimensional array of micromirrors 204 on the substrate surface 104. The micromirrors 204 are divided into a plurality of input mirrors 304 and a plurality of output mirrors 306. The substrate 100 is attached to the sidewalls 308. The sidewalls 308 are then attached to a first cap 310.

The substrate 100, sidewalls 308, and the first cap 310 together provide a volume. This volume is preferably hermetically sealed. If the substrate 100 is hermetically sealed, then the fibers 106 can be dust and moisture proof sealed without the need to hermetically seal them. This provides ease in assembly of the switch with the fibers 106. If the volume is hermetically sealed, since this volume is small, it is possible to pressurize the volume prior to sealing. A high pressure within the volume will assist in damping the ringing of the micromirrors 204, as well as allow better heat dissipation due to greater thermal conductivity.

Within this volume, chips 202 with micromirrors 204, conductive traces 208 (FIG. 1), and integrated circuits 212 populate the surface 104 of the substrate 100. The first cap 310 is a slab with its larger surfaces parallel to the substrate surface 104. Above the first cap 310 is a second cap 316. Sidewalls 322 attach the second cap 316 to the substrate 100. Preferably, the sidewalls 322 are hermetically attached to the second cap 316 and the substrate 100. In final assembly, a double packaging architecture is provided. Then, the fiber optic array 106 is aligned, and the housing 108 is attached to the substrate 100.

In performing a switching operation, a light beam 301 enters the switch 300 from the substrate surface 102 via an input optical fiber 106 attached to the housing 108. A light beam 301 traverses through the substrate 100 and exits from the surface 104 at a portion absent of components and conductive traces 208. After the light beam 301 exits the substrate surface 104, a reflecting area 312 on the first cap 310 directs the beam 301 onto a specific input mirror 314. The reflecting area 312 may be on either of the surfaces of the first cap 310 parallel to the substrate surface 104.

The reflecting area 312 may be a flat mirror or a curved mirror. If curved, it is preferably spherical, which would substitute for the collimators 110 (FIG. 2) in the housing 108. The collimated portion of the beam 301 then begins at this mirror on the first cap 310. The reflecting area 312 can also be fabricated into an appropriate diffractive lens, to accomplish the same objective as the curved mirror. After reflection from the input micromirror 314, the light beam 301 is directed through the first cap 310 towards the second cap 316. The area through which the beam 301 penetrates the first cap 310 is transparent. The bottom or top surface of the second cap 316 is partially or wholly reflective. A reflection occurs at the second cap 316 which directs the light beam 301 to the desired output mirror 318. Importantly, the reflection from the input mirror 314, to the second cap 316, and then to the output mirror 318, folds the beam 301 so that the distance between switch components 314 & 318, and thus the height of the package 300, is drastically reduced.

The output mirror 318 directs the light beam 301 towards another reflecting area 320 on the first cap 310. The reflecting area 320 functions in a similar manner as reflecting area 312. The reflecting area 320 directs the beam 301 through the substrate 100 from the surface 104. The beam 301 is refocused by a collimator 110 (FIG. 2) in the housing 108 and directed to a specific output fiber 106. In this manner, a light beam from any input fiber can be directed to any output fiber.

The use of the first cap 310 allows for only a short distance to be used in redirecting the light 301 from the collimator 110 onto the input mirror 314, and from the output mirror 318 back to the collimator 110. The major portion of the beam, i.e., from the input mirror 314 to the second cap 316 and then to the output mirror 318, is thus available for scanning. Preferably, this portion is the Rayleigh Length of the beam minus twice the redirection length, with the micromirrors 204 optimized for this length. The "waist" of the beam then corresponds to the reflecting location on the second cap 316. It is important to limit the scanned portion of the beam to this length because diffraction of the light beam beyond the Rayleigh Length produces increased loss and crosstalk. The Rayleigh Length is well known in the art and will not be described further here. Additionally, with the substrate 100 populated with the modular approach in accordance with the present invention, the redirection length is the same for each micromirror 204 in the array. With the micromirrors 204 in such close proximity to the collimator 110, the fibers 106 and/or the collimators 210 have greater angular alignment tolerance.

This architecture is further described in two co-pending U.S. patent applications: "Double Hermetic Package For Fiber Optic Cross Connect", Ser. No. 09/549,798, filed on Apr. 14, 2000; and "Fiber Optic Cross Connect with Uniform Light Redirection Length and Folding of Light Beams", Ser. No. 09/549,388, filed on Apr. 14, 2000. Applicants hereby incorporate these patent applications by reference.

In the preferred embodiment, arrays of photodetectors or other types of detectors for monitoring traffic may also be used with the architecture which provides a uniform redirection length and folding of light beams in accordance with the present invention. The information received from the photodetectors can be used to confirm the proper selection of input/output channels in the light beams and for monitoring the data flow. Photodetectors can monitor traffic in real time while slow photodetectors can be used to confirm correct channel switching.

Figure 4A:
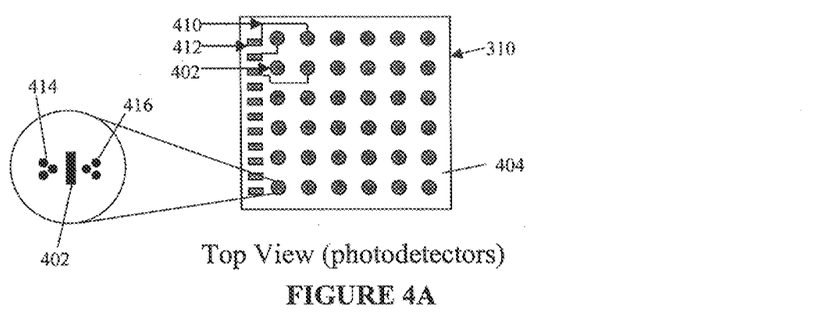
FIG. 4A and 4B illustrate a top view and a side view, respectively, of an array of photodetectors on the short cap in accordance with the present invention.
Figure 4B:
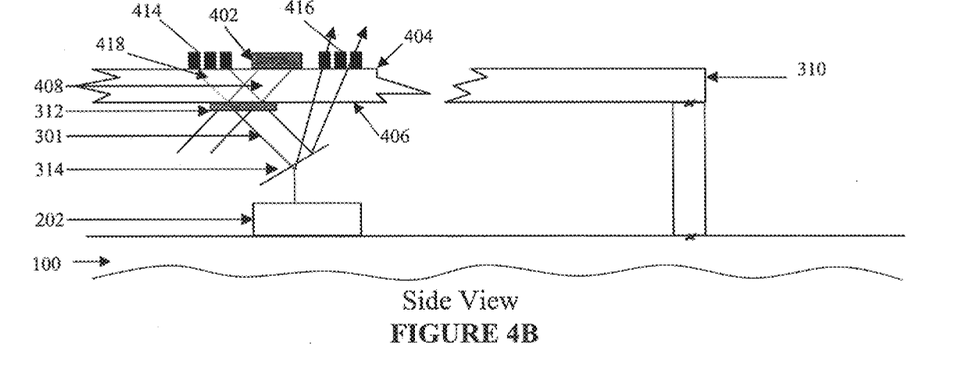

One possible location for the array of photodetectors is on the first cap 310. FIGS. 4A and 4B illustrate a top view and a side view, respectively, of an array of photodetectors on the first cap in accordance with the present invention. An array of photodetectors 402 can be attached on the top surface 404 of the first cap 310 for detection and interpretation of the light beam 301. As illustrated in FIG. 4B, in this case, the reflecting surface 312 in the first cap 310 would be on the bottom surface 406 and partially transmitting in order to allow some light 408 to proceed to the photodetector 402. The top surface 404 (FIG. 4A) would contain conductive traces 410 to carry the photodetector signals to the edge of the first cap 310, where it would be electrically connected to the traces on the substrate 100, such as wirebonds 412 from bonding pads.

In addition to photodetector 402, triangular clusters of three or more equally spaced photodetectors 414–416 can be used on either side of a photodetector 402 to perform other monitoring or sensing functions such as mirror angle sensing. Assuming that the light beam 301 is traveling in the output direction, the three photodetector signals around the beam 418 can be used to interpret the 'centering' of the beam 418. By combining information from the triangular clusters of photodetectors 414–416 around each beam 418, and the optical power focused into a fiber, the required mirror position for maximum optical power transfer can be determined. Every possible switch configuration can be optimized and the corresponding mirror position recorded, to be utilized repeatedly throughout the operating life of the switch.

Figure 5:
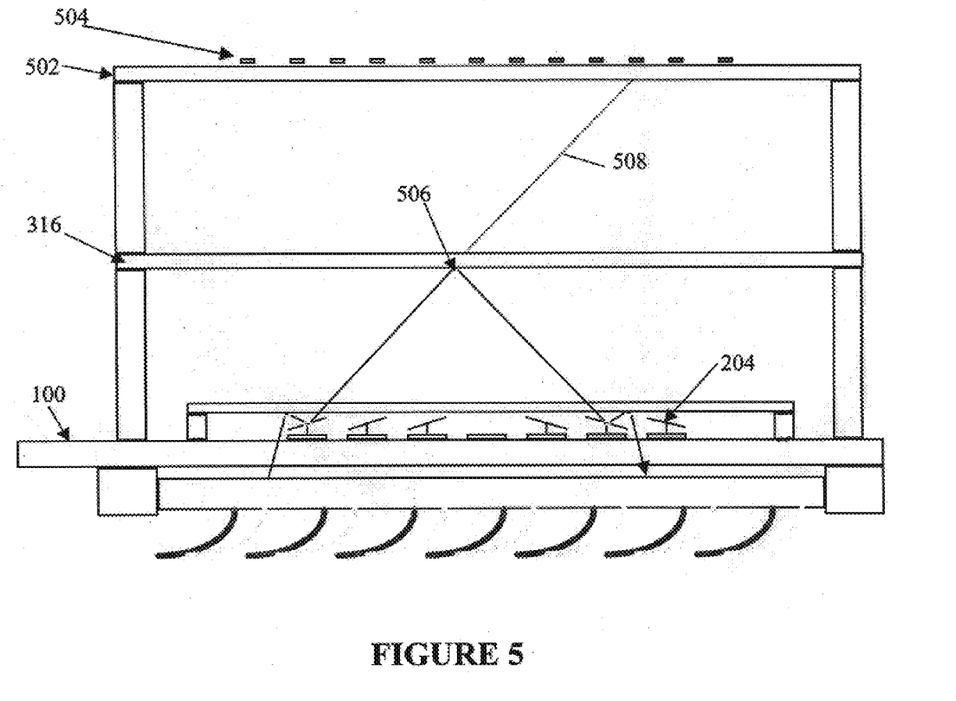
FIG. 5 illustrates an alternative switch architecture which utilizes a substrate populated with the modular approach in accordance with the present invention.

FIG. 5 illustrates an alternative switch architecture which utilizes a substrate populated with the modular approach in accordance with the present invention. This architecture is identical to the architecture illustrated in FIG. 1 except for the addition of a third cap 502. An array of photodetectors 504 can be attached to the third cap 502. The third cap 502 is preferably positioned from the second cap 316 at a distance which is approximately the same distance from the micromirrors 204 to the second cap 316. In this case, the reflecting surface 506 on the second cap 316 is partially transmitting to allow some light 508 to proceed to the photodetectors 504. The characteristics of beams 508 at the micromirror array 204 are the same for the light beams on the third cap 502. Photodetectors 504 (single or in multiples) can be used similarly to the ones on the first cap 310 as described above to collect mirror position information or to monitor traffic on the optical beam.

Although the photodetectors are described as being located on the first cap 310 or the third cap 502, one of ordinary skill in the art will understand that the photodetectors may be placed at other locations without departing from the spirit and scope of the present invention. For example, a cluster of three photodetectors can be placed on the substrate 100 where the light beam enters/exists the substrate 100. For another example, the photodetectors may be n the housing 108 surrounding the collimators 110, or on the fibers 106.

Although the modular approach has been disclosed with the substrate and with the switch architectures above, one of ordinary skill in the art will understand that the modular approach may be used with other substrates and switch architectures without departing from the spirit and scope of the present invention.

An OXC package which utilizes a modular approach to substrate population has been disclosed. Chips containing micromirrors are fabricated in clusters so that groups of micromirrors can be separately placed onto the substrate. This provides flexibility in how the substrate is populated. In the preferred embodiment, the clusters are in the form of strips. Only strips with known good micromirrors are placed onto the substrate, thus improving the device yield. Also, if any of the micromirrors become damaged after placement, its chip may be replaced without disturbing the other chips. Using a substrate through which light may travel in combination with a modular approach to substrate population allows for a single device switch with a higher device yield and scalability. Integrated circuits may be placed on the same substrate as the micromirrors, and the complexity of the assembly process is reduced. In the preferred embodiment, the substrate populated with the modular approach in accordance with the present invention is used in a OXC package comprising a first cap with reflecting surfaces and a second cap. With the first cap, only a short distance is used in redirecting the light. The major portion of the beam is thus available for scanning. With the second cap, the light beam is folded during the switching operation, thus resulting in a smaller switch package.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A fiber optic cross connect (OXC), comprising:
a substrate, wherein the substrate comprises a first surface and a second surface, wherein the substrate comprises holes through which the light beams travel; and
a micromirror array coupled to the second surface of the substrate, wherein the micromirror array comprises a plurality of clusters, wherein each of the plurality of clusters comprises at least one micromirror of the micromirror array.

2. The OXC of claim 1, wherein the micromirror array comprises a plurality of static mirrors.

3. The OXC of claim 1, wherein the micromirror array comprises a plurality of active mirrors.

4. The OXC of claim 1, wherein each of the plurality of clusters is in a shape of a strip.

5. The OXC of claim 1, wherein the micromirror array comprises a plurality of input micromirrors and a plurality of output micromirrors.

6. The OXC of claim 1, wherein the micromirror array is a two dimensional array.

7. The OXC of claim 1, wherein the substrate comprises a double-sided polished wafer.

8. A fiber OXC, comprising:
a slab, wherein the slab comprises a first surface and a second surface;
a micromirror array coupled to the second surface of the slab, wherein the micromirror array comprises a plurality of clusters, wherein each of the plurality of clusters comprises at least one micromirror of the micromirror array;
integrated circuits coupled to the first or second surfaces of the slab; and
conductive traces coupled to the first or second surfaces of the slab, wherein the integrated circuits and the conductive traces coupled to the second surface of the slab are absent from paths of light beams traveling through the slab.

9. A fiber OXC, comprising:
a slab, wherein the slab comprises a first surface and a second surface, wherein the slab is transparent to wavelengths of interest; and
a micromirror array coupled to the second surface of the slab, wherein the micromirror array comprises a plurality of clusters, wherein each of the plurality of clusters comprises at least one micromirror of the micromirror array.

10. A fiber OXC, comprising:
a slab, wherein the slab comprises a first surface and a second surface, wherein the slab comprises:
a first anti-reflective coating on the first surface of the slab, and
a second anti-reflective coating on the second surface of the slab; and
a micromirror array coupled to the second surface of the slab, wherein the micromirror array comprises a plurality of clusters, wherein each of the plurality of clusters comprises at least one micromirror of the micromirror array.

11. A fiber OXC, comprising:
a slab, wherein the slab comprises a first surface and a second surface;
a micromirror array coupled to the second surface of the slab, wherein the micromirror array comprises a plurality of clusters, wherein each of the plurality of clusters comprises at least one micromirror of the micromirror array;
a housing, the housing containing a plurality of optical fibers, wherein the plurality of optical fibers are each optically coupled to the first surface of the slab; and
a plurality of collimators within the housing and optically coupled to the plurality of optical fibers.

12. The OXC of claim 11, further comprising:
a first cap optically coupled to the micromirror array, wherein the first cap is parallel to the first and second surfaces of the slab;
a first set of sidewalls coupled to the first cap and the second surface of the slab;
a second cap optically coupled to the micromirror array, wherein the second cap folds light beams during a switching operation, wherein the second cap is parallel to the first cap; and
a second set of sidewalls coupled to the second cap and the second surface of the slab.

13. The OXC of claim 12, wherein the first cap further comprises:
a plurality of reflecting surfaces on a first surface of the first cap, wherein the plurality of reflecting surfaces reflects the light beams from the plurality of collimators to the micromirror array and from the micromirror array to the plurality of collimators.

14. The OXC of claim 13, wherein a distance traveled by the light beams between the plurality of collimators and the micromirror array is identical for each micromirror in the micromirror array.

15. The OXC of claim 13, further comprising:
a plurality of photodetectors residing on a second surface of the first cap, wherein the first surface of the first cap is parallel to the second surface of the first cap.

16. The OXC of claim 13, wherein the plurality of reflecting surfaces comprises a plurality of flat mirrors.

17. The OXC of claim 13, wherein the plurality of reflecting surfaces comprises a plurality of curved mirrors.

18. The OXC of claim 12, further comprising a third cap optically coupled to the second cap, wherein a distance between the third cap and the second cap is approximately equal to a distance between the micromirror array and the second cap; and a third set of sidewalls coupled to the third cap and the second cap.

19. The OXC of claim 18, further comprising a plurality of photodetectors residing on the third cap.

20. A fiber OXC, comprising:
   a slab, wherein the slab comprises a first surface and a second surface;
   a micromirror array coupled to the second surface of the slab, wherein the micromirror array comprises a plurality of clusters, wherein each of the plurality of clusters comprises at least one micromirror of the micromirror array; and
   a plurality of photodetectors residing on the slab at a location where light beams travel in or out of the slab.

21. A system, comprising:
   a fiber optic transmission system; and
   an OXC optically coupled to the fiber optic transmission system, the OXC comprising:
      a slab optically coupled to the fiber optic transmission system, wherein the slab comprises a first surface and a second surface, wherein the slab is transparent to wavelengths of interest, and
      a micromirror array coupled to the second surface of the slab, wherein the micromirror array comprises a plurality of clusters, wherein each of the plurality of clusters comprises at least one micromirror of the micromirror array.

22. The OXC of claim 11, further comprising:
   a plurality of collimators within the housing and optically coupled to the plurality of optical fibers.

* * * * *